US007231650B1

(12) United States Patent
Pinera et al.

(10) Patent No.: US 7,231,650 B1
(45) Date of Patent: Jun. 12, 2007

(54) METHOD OF GEOGRAPHICALLY AND FINANCIALLY EXPANDING THE BUSINESS POTENTIAL AND COMMERCIAL FALL-OUT OF LOCAL LIVE EVENT PERFORMANCES SUCH AS ROCK AND MUSICAL CONCERTS AND THE LIKE

(75) Inventors: Mike Pinera, Concord, NH (US); Justice C. Rines, Concord, NH (US)

(73) Assignee: Poetic Justice International Company

( * ) Notice: Subject to any disclaimer, the term of this patent is extended or adjusted under 35 U.S.C. 154(b) by 1616 days.

(21) Appl. No.: 09/705,208

(22) Filed: Nov. 2, 2000

(51) Int. Cl.
*H04N 7/16* (2006.01)

(52) U.S. Cl. .............................................. 725/1; 725/5

(58) Field of Classification Search .................. 705/14, 705/26, 40; 725/1-153; 369/1; *H04N 7/16; G06F 17/60*
See application file for complete search history.

(56) References Cited

OTHER PUBLICATIONS www.concertpromoters.com.
www.io.com/-edmiller/Promoinfo.html#top.
http://alanr.lpl.org/ProductionTips.html.
www.spiderblue.com.

*Primary Examiner*—Vivek Srivastava
(74) *Attorney, Agent, or Firm*—Rines and Rines

(57) ABSTRACT

A novel method of geographically and financially expanding the business potential and commercial fall-out of local live event performances, such as local rock or other music concerts and the like, by enabling the live performance content simultaneously to be presented to multi-media outlets, including pay T.V., Internet, radio stations and movie picture theatres, vertically integrated to receive and simultaneously play the content of the local live performance and with superposed simultaneous infomercial material.

20 Claims, 3 Drawing Sheets

Figure 1:
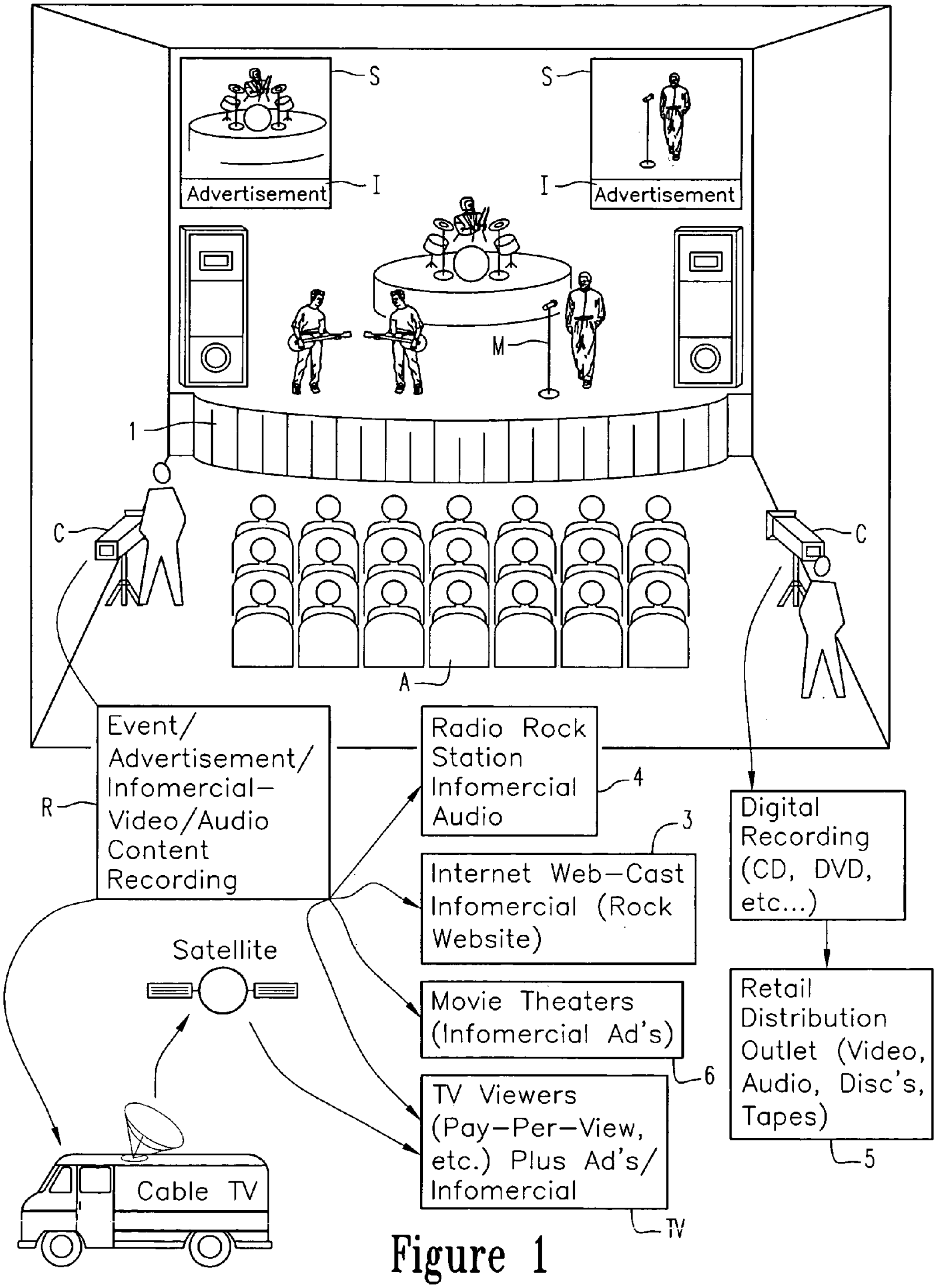

Chart of Financial Return Venues (1) through (7)

1— Live Concert Audience
(1), (3), (4)

TV— Pay—Per—View
(2), (3), (4)

4— Radio Simulcast
(6), (3), (4)

3— Internet Web—Cast
(5), (3), (4)

6— Movie Theaters
(7), (3), (4)

5— Retail Distribution

Figure 3

METHOD OF GEOGRAPHICALLY AND FINANCIALLY EXPANDING THE BUSINESS POTENTIAL AND COMMERCIAL FALL-OUT OF LOCAL LIVE EVENT PERFORMANCES SUCH AS ROCK AND MUSICAL CONCERTS AND THE LIKE

The present invention relates to methods of doing or conducting the business of presenting live local event performances such as rock or other music concerts or other events and the like, being more particularly concerned with geographically and financially expanding the business potential and commercial fall-out of such local live event performances, and principally substantially simultaneously with the live local performance.

BACKGROUND

Heretofore, the promoters and artists performing live rock and other musical concerts and other events have received their financial return from ticket and merchandise sales at the concert, concessions, etc. and later from the sale of video and audio tapes and discs recorded at the concert, and there advertised by fliers, sound announcements, and by ads projected on the customary large video screens flanking the performers on the stage. Occasionally, the live performance will be telecast and may be made available for the pay-for-view home television audience. Reference may be made, for example, to www.concertpromoters.com, www.io.com/-ed-miller/Promoinfo.html#top, http://alanr.lpl.org/Production-Tips.html and www.spiderblue.com which describe typical present-day operations of this type.

In accordance with the present invention, the financial return is enormously expanded by enabling the content of the live local performance simultaneously to reach and be presented (for additional financial return) to much greater audiences by enabling the live performance and content simultaneously to be presented over an expanded geographical area and to all known and varied types of multi-media outlets, all vertically integrated to receive and play the content of the local live performance in real-time, or, if required, delayed. Additionally, by superposing simultaneous direct response infomercial selling and advertising material, a much more vast customer reach can be obtained that further materially expands the financial receipt potential thereof, as well.

OBJECTS OF INVENTION

It is accordingly a primary object of the present invention to provide a new and improved method of doing and conducting the live local concert and other event performance business, widely to expand the geographical limits and financial return and commercial fall-out potential of the same through the vertical integration of varied digital media outlets, simultaneously with the live performance, to receive and play the content of the local live performance, and further with superposed or supplementary simultaneous materially expanded infomercial selling and advertising reach therewith.

Other and further objects will be explained hereinafter and are more particularly pointed out in connection with the appended claims.

SUMMARY

In summary, from the most all-encompassing viewpoint, the invention embraces a method of widely expanding the venues of marketing and receiving financial returns for live locally performed entertainment and other events simultaneously with the live local performing of the event, that comprises, during the live performing of the event for a live paying audience that provides a first financial return, simulcasting the live performance to widely disposed pay-for-view television reception venues for generating a second venue of financial return; digital video and audio recording the live performance and producing digital discs and tapes therefrom; during and simultaneously with said simulcasting, supplementing the telecast program with marketing advertisements superposed or interleaved on the program for infomerically soliciting sales of the recorded digital discs and tapes of the event and other materials for advertising the event for generating a third venue of potential financial return; projecting large screen displays of the performance to the live audience simultaneously with the performing of the event, and superposing or injecting marketing advertisements on the large screen displays for viewing by the live audience and also by the telecast audience for generating a fourth venue of potential financial return; simultaneously with the performing of the event, broadcasting the digital video and audio content over an internet web for both internet paying viewers and internet infomercials for generating a fifth venue of financial return; during said performing of the event, transmitting the audio component of the performance to radio broadcasting stations and together with performance event marketing information, as a sixth venue of financial return; and further during said performing of the event, carrying the video, audio and infomercial performance content to motion picture houses for display to their audiences, for generating a seventh venue of financial return; whereby universal and simultaneous integrated extension of reach of the live performance and its commercial potential is promulgated to expanded digital marketing venues, significantly to expand the business opportunities initiated by the live-local-entertainment performance and the financial return potential thereof.

Preferred and best mode implementations and procedures are later set forth in detail.

DRAWINGS

The invention will now be described in connection with the accompanying drawings, FIGS. 1 and 2 of which are complementary block system diagrams illustrating an application of the invention in preferred form; and FIG. 3 is a chart representing the various different and expanded income sources created by doing business in accordance with the novel method of the invention.

DESCRIPTION OF PREFERRED EMBODIMENT

Figure 2:
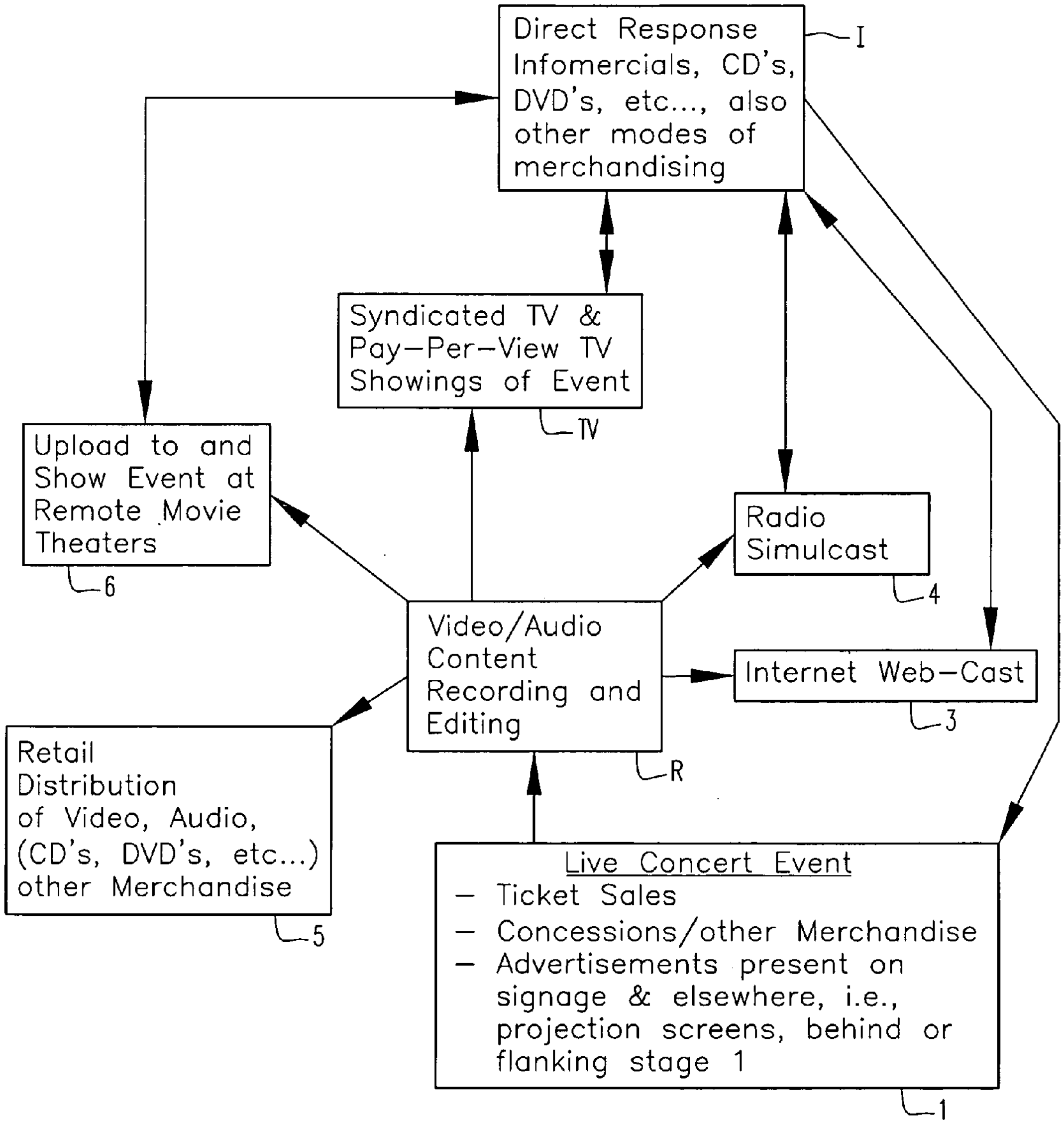

Referring to FIGS. 1 and 2, the before-described customary live concert performers, for example, are shown on the stage 1, playing to the audience A which pays the ticket admission charges and merchandise local sales constituting the usual venue of financial return, and designated at (1) in the income chart of FIG. 3. The audience A also views the large screens S flanking and behind the stage that simultaneously project the video images created at cameras C and the audio content received at microphones M and played over loudspeakers for respective viewing and listening, particularly by members of the live audience more distant from the stage. Conventional digital recording of the video and audio performance content is also simultaneously effected at R as previously stated; and, if desired, discs can be immediately (or later) edited, made and provided. Television cable and satellite may be broadcast ("simulcast"), as represented at "satellite" and "cable" and "TV", for viewing, for example, by syndicated TV or pay-per-view (PPV) television viewers", (real time or delayed), providing a second venue of financial return, labeled (2) in FIG. 3.

During and simultaneously with this simulcast telecasting, the invention supplements the telecast program content with infomercial sales pitches and marketing advertisements I superposed on or interleaved with the program to generate interest by the television audiences in the recorded digital discs and tapes for direct-response CD, DVD, etc. merchandising and also for event advertising and ticket purchases, etc.—all constituting still a third venue of simultaneously solicited financial return, and designated at the regions (3) in FIG. 3. This same infomercial and advertising supplementation may also be displayed simultaneously (intermittently, periodically, streaming, etc.) on the projection screens S as at I in FIG. 1, for viewing by the live audience, and also by the telecast audience where the screen presentations are telecast, generating still a fourth venue potential of financial return, (4) in FIG. 3.

The invention also contemplates in addition to the TV media outlets, the simultaneous incorporating of other digital media outlet presentations, presenting the video and audio content on the Internet, labeled in FIGS. 1 and 2 as Internet Web-Cast 3, and serving as still a fifth income venue, designated at (5) in FIG. 3, and also adapted supplementarily to carry interspersed, interleaved or superposed infomercial materials I, generating financial returns, also, of the before-described types (3) and (4).

Another digital media outlet simultaneously integratable, includes the radio stations in the area ("Radio Stations" 4 in FIG. 1 and "Radio Simulcast" in FIG. 2), which; during the live performance, as shown, can receive the audio component of the performance including also the audio component of interposed infomercials and advertisements, providing still a further business income expansion or extension into a sixth venue (6), FIG. 3, of financial return.

And added to the vertical integration of the above varied media outlets, may also be the moving picture or movie theater venue, so-labeled at 6 in FIGS. 1 and 2, to which the recorded (and edited) performance may be uploaded and remoted to enable the movie theater to display to their audiences, also, in real or delayed time, generating a seventh added venue of financial return, (7) in FIG. 3.

These added media outlets that may thus so significantly geographically and financially expand the live performance—TV, Internet, Radio Stations, Movie Theaters—are all, in accordance with the method of the invention, operatable and promulgated simultaneously with the local live performance (or, if desired, used with delayed presentation). A further outlet labeled "Retail Distribution" in FIGS. 1 and 2, while accessible substantially simultaneously by record purchasers, can also provide the entertainment CD, DVD, etc. products for later retail and other distribution as well.

In order to target the audiences most likely to have interest in the particular event broadcast on TV, or to access the Internet, or to tune into the radio station, those media outlets should be selected that have the specialty of the particular event or the specific special type of audience interest corresponding to the type of concert or event being performed live; for example, classic rock music concerts. The telecast is then preferably directed to special rock TV channels; the audio broadcast, to rock radio stations; and to rock web sites on the Internet. It should also be noted from FIGS. 1 and 2 that the various media outlets are cross-linked with the same infomercial and advertising I.

While the preferred business method of operation above-discussed intends to embrace all types of digital media outlets, some only may be used, if desired; and further modifications will also occur to those skilled in this art, such being therefore considered to fall within the spirit and scope of the invention is defined in the appended claims.

What is claimed:

1. A method of widely expanding the venues of marketing and receiving financial returns for live locally performed entertainment and other events simultaneously with the live local performing of the event, that comprises, during the live performing of the event for a live paying audience that provides a first financial return, simulcasting the live performance to widely disposed pay-for-view television reception venues for generating a second venue of financial return; digital video and audio recording the live performance and producing digital discs and tapes therefrom; during and simultaneously with said simulcasting, supplementing the telecast program with marketing advertisements superposed or interleaved on the program for infomercially soliciting sales of the recorded digital discs and tapes of the events and other materials and for advertising events for generating a third venue of potential financial return; projecting large screen displays of the performance to the live audience simultaneously with the performing of the event, and superposing or injecting marketing advertisements on the large screen displays for viewing by the live audience and also by the telecast audience for generating a fourth venue of potential financial return; simultaneously with the performing of the event, broadcasting the digital video and audio content over an internet web for both internet paying viewers and internet infomercials for generating a fifth venue of financial return; during said performing of the event, transmitting the audio component of the performance to radio broadcasting stations and together with performance event marketing information, as a sixth venue of financial return; and further during said performing of the event, carrying the video, audio and infomercial performance content to motion picture houses for display to their audiences, for generating a seventh venue of financial return; whereby universal and simultaneous integrated extension of reach of the live performance and its commercial potential is promulgated to expanded digital marketing venues, significantly to expand the business opportunities initiated by the live-local-entertainment performance and the financial return potential thereof.

2. The method of claim 1 wherein the simulcast, Internet and radio carrying of the performance content are cross-linked.

3. The method claim 1 wherein the event comprises a rock or other specific type of music concert and one or more of the simulcast, Internet and radio activities are directed to corresponding specialized rock or other specific type channels.

4. A method of widely expanding the venues of marketing and receiving financial returns for live locally performed entertainment and other events simultaneously with the live local performing of the event, that comprises, during the live performing of the event for a live paying audience that provides a first financial return, digital video and audio recording the live performance and producing digital discs and tapes therefrom; simulcasting the live performance to widely disposed pay-for-view television reception venues for generating a second venue of financial return; during and simultaneously with said simulcasting, supplementing the telecast program with marketing advertisements superposed or interleaved on the program for infomercially soliciting sales of the recorded digital discs and tapes of the event and other materials and for advertising events for generating a third venue of potential financial return; projecting large screen displays of the performance to the live audience simultaneously with the performing of the event, and superposing or injecting marketing advertisements on the large screen displays for viewing by the live audience and also by the telecast audience for generating a fourth venue of potential financial return; simultaneously with the performing of the event, broadcasting the digital video and audio content over an internet web for both internet paying viewers and internet infomercials for generating a fifth venue of financial return; whereby simultaneous integrated extension of the reach of the live performance and its commercial potential it promulgated to expanded digital marketing venues, significantly to enlarge the business opportunities initiated by the live-local entertainment performance and the financial return potential.

5. A method of widely expanding the venues of marketing and receiving financial returns for live locally performed entertainment and other events simultaneously with the live local performing of the event, that comprises, during the live performing of the event for a live paying audience that provides a first financial return, simulcasting the live performance to widely disposed pay-for-view television reception venues for generating a second venue of financial return; digital video and audio recording the live performance and producing digital discs and tapes therefrom during and simultaneously with said simulcasting, supplementing the telecast program with marketing advertisements superposed on the program for infomercially soliciting sales of the recorded digital discs and tapes of the event and other materials and for advertising events for generating a third venue of potential financial return; projecting large screen displays of the performance to the live audience simultaneously with the performing of the event, and superposing or injecting marketing advertisements on the large screen displays for viewing by the live audience and also by the telecast audience for generating a fourth venue of potential financial return; and further during said performing of the event, carrying the video, audio and, infomercial performance content to motion picture houses for display to their audiences, for generating an additional venue of financial return; whereby simultaneously integrated extension of the reach of the live performance and its commercial potential is promulgated to expanded digital marketing venues, significantly to expand the business opportunities initiated by the live-local entertainment performance and the financial return potential.

6. A method of widely expanding the venues of marketing and receiving financial returns for live locally performed entertainment and other events simultaneously with the live local performing of the event, that comprises, during the live performing of the event for a live paying audience that provides a first financial return, simulcasting the live performance to widely disposed pay-for-view television reception venues for generating a second venue of financial return; digital video and audio recording the live performance and producing digital discs and tapes therefrom during and simultaneously with said simulcasting, supplementing the simulcasting program with marketing advertisements superposed on the program for soliciting sales of recorded digital discs and tapes and other materials infomercially and for advertising events for generating a third venue of potential financial return; projecting large screen displays of the performance to the live audience simultaneously with the performing of the event, and superposing or injecting marketing advertisements on the large screen displays for viewing by the live audience and also by the telecast audience for generating a fourth venue of potential financial return; during said performing of the event, transmitting the audio component of the performance to radio broadcasting stations and together with marketing information as a further venue of financial return; whereby simultaneous integrated extension of the reach of the live performance and its commercial potential is promulgated to expanded digital marketing venues, significantly to expand the business opportunities initiated by the live-local entertainment performance and the financial return potential.

7. The method of claim 1 wherein one or more of viewing or listening to the television simulcasting of the live performance, on the internet web, on the radio broadcasts, and at the motion picture house display, is delayed before presentation.

8. The method of claim 4 wherein one or more of viewing or listening to the television simulcasting of the live performance and broadcasting on the internet web, is delayed before presentation.

9. The method of claim 5 wherein one or more of viewing or listening to the television simulcasting and on the motion picture house display, is delayed before presentation.

10. The method of claim 6 wherein one or more of viewing or listening to the television simulcasting of the live performance and on the radio broadcasts, is delayed before presentation.

11. A method of widely expanding the venues of marketing and receiving financial returns for live locally performed entertainment and other events simultaneously with the live local performing of the event, that comprises, during the live performing of the event for a live paying audience that provides a first financial return, broadcasting the digital video and audio content of the live performance over an internet web for both internet paying viewers and internet infomercials for generating a second venue of financial return; digital video and audio recording the live performance and producing digital discs and tapes therefrom; during and simultaneously with said broadcasting, supplementing the internet program content with marketing advertisements superposed or interleaved thereon for infomercial soliciting sales of the recorded digital discs and tapes of the events and other materials and for advertising events for generating a third venue of potential financial return; projecting large-screen displays of the performance to the live audience simultaneously with the performing of the event, and superposing or injecting marketing advertisements on the large-screen displays for viewing by the live audience and also by the internet audience for generating a fourth venue of potential financial return; simultaneously with the performing of the event transmitting the audio component of the performance to radio broadcasting stations and together with performance event marketing information, as a fifth venue of financial return; and further during said performing of the event, carrying the video, audio and infomercial performance content to motion picture houses for display to their audiences for generating a sixth venue of financial return; whereby universal and simultaneous integrated extension of reach of the live performance and its commercial potential is promulgated to expanded digital marketing venues, significantly to expand the business opportunities initiated by the live-local entertainment performance and the financial return potential thereof.

12. A method of widely expanding the venues of marketing and receiving financial returns for live locally performed entertainment and other events simultaneously with the live local performing of the event, that comprises, during the live performing of the event for a live paying audience that provides a first financial return, digital video and audio recording the live performance and producing digital discs and tapes therefrom; broadcasting the digital video and audio content of the live performance over an internet web for both internet paying viewers and internet infomercials for generating a second venue or financial return; during and simultaneously with said broadcasting, supplementing the internet broadcast with marketing advertisements superposed or interleaved thereon for infomercially soliciting sales of the recorded digital discs and tapes of the event and other materials and for advertising events for generating a third venue of potential financial returns; projecting large-screen displays of the performance to the live audience, simultaneously with the performing of the event, and superposing or injecting marketing advertisements on the large-screen displays for viewing by the live audience and also by the internet audience for generating a fourth venue of potential financial return; whereby simultaneous integrated extension of the reach of the live performance and its commercial potential is promulgated to expanded digital marketing venues, significantly to enlarge the business opportunities initiated by the live-local entertainment performance and the financial return potential.

13. A method of widely expanding the venues of marketing and receiving financial returns the live locally performed entertainment and other events simultaneously with the live local performing of the event, that comprises, during the live performing of the event for a live paying audience that provides a first financial return, broadcasting the digital video and audio content of the live performance over an internet web for both internet paying viewers and internet infomercials for generating a second venue of financial return; digital video and audio recording the live performance and producing digital discs and tapes therefrom and supplementing the internet content with marketing advertisements superposed thereon for infomercially soliciting sales of the recorded digital discs and tapes of the event and other materials and for advertising events for generating a third venue of potential financial return; projecting large-screen displays of the performance to the live audience simultaneously with the performing of the event, and superposing are injecting marketing advertisements on the large-screen displays for viewing by the live audience and also by the internet audience for generating a fourth venue of potential financial return; and further during said performing of the event, carrying the video, audio and common infomercial performance content to motion picture houses to display to the audiences for generating additional venue of financial return; whereby simultaneously integrated extension of the reach of the live performance and its commercial potential is propagated to expand digital marketing venues, significantly to expand the business opportunities initiated by the live-local entertainment performance and the financial return potential.

14. A method of widely expanding the venues of marketing and receiving financial returns for live locally performed entertainment and other events simultaneously with the live local performing of the event, that comprises, during the live performing of the event for a live paying audience that provides a first financial return, broadcasting the digital video and audio content of the live performance over an internet web for both internet paying viewers and internet infomercials for generating a second venue of financial return; digital, video and audio recording the live performance and producing digital discs and tapes therefrom during and simultaneously with said broadcasting and supplementing the internet content with marketing advertisements superposed thereon for soliciting sales of recorded digital discs and tapes and other materials infomercially and for advertising events for generating a third venue of potential financial return; projecting large screen displays of the performance to the live audience simultaneously with the performing of the event, and superposing or injecting marketing advertisements on the large-screen displays for viewing by the live audience and also by the internet audience for generating a fourth venue of potential financial return; during said performing of the event, transmitting the audio component of the performance to radio broadcasting stations and together with marketing information as a further venue of financial return; whereby simultaneous integrated extension of reach of the live performance and its commercial potential is promulgated to expanded digital marketing venues, significantly to expand the business opportunities initiated by the live-local entertainment performance and the financial return potential.

15. The method of claim 11 wherein one or more of viewing or listening to the performance on the internet web, on the radio broadcasts, and at the motion picture house display, is delayed before presentation.

16. The method of claim 12 wherein the viewing or listening to the performance on the internet web, is delayed before presentation.

17. The method of claim 13, wherein one or more of viewing or listening to the performance on the internet web and on the motion picture house display, is delayed before presentation.

18. The method of claim 14, wherein one or more of viewing or listening to the performance on the internet web and on the radio broadcasts, is delayed before presentation.

19. A method of widely expanding the venues of marketing and receiving financial returns for live locally performed entertainment and other events simultaneously with the live local performing of the event, that comprises, during the live performing of the event for a live paying audience that provides a first financial return, digital video and audio recording the live performance and producing digital discs and tapes therefrom during and simultaneously with said performance; projecting large screen displays of the performance to the live audience simultaneously with the performing of the event, and superposing or injecting marketing advertisements on the large screen displays for viewing by the live audience including infomercially soliciting sales of recorded digital discs and tapes and other materials and for advertising events for generating a third venue of potential financial return; and further during said performing of the event, carrying the video and audio performance and infomercial content to motion picture houses for display to their audiences for generating an additional venue of financial return; whereby simultaneously integrated extension of the reach of the live performance and its commercial potential is promulgated to expanded digital marketing venues, significantly to expand the business opportunities initiated by the live-local entertainment performance and the financial return potential.

20. A method of widely expanding the venues of marketing and receiving financial returns for live locally performed entertainment and other events simultaneously with the live local performing of the event, that comprises, during the live performing of the event for a live paying audience that provides a first financial return, digital video and audio recording the live performance and producing digital discs and tapes therefrom during and simultaneously with said performance; projecting large screen display of the performance to the live audience simultaneously with the performing of the event, and superposing or injecting marketing advertisements on the large screen displays for viewing by the live audience including infomercially soliciting sales of the recorded digital discs and tapes and other materials and for advertising events for generating a third venue of potential financial return; and further during said performing of the event, transmitting the audio component of the performance to radio broadcasting stations and together with marketing information as a further venue of financial return; whereby simultaneous integrated extension of the reach of the live performance and its commercial potential is promulgated to expanded digital marketing venues, significantly to expand the business opportunities initiated by the live-local entertainment performance and the financial return potential.

* * * * *